(12) United States Patent
Kikuchi et al.

(10) Patent No.: US 7,233,735 B2
(45) Date of Patent: Jun. 19, 2007

(54) DIGITAL RECORDING/REPRODUCING APPARATUS WITH BUILT-IN STORAGE MEDIUM

(75) Inventors: Shinichi Kikuchi, Yokohama (JP); Hideo Kataoka, Tokyo (JP); Kazuya Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1149 days.

(21) Appl. No.: 09/994,917

(22) Filed: Nov. 28, 2001

(65) Prior Publication Data

US 2002/0064368 A1 May 30, 2002

(30) Foreign Application Priority Data

Nov. 30, 2000 (JP) ............................. 2000-365928

(51) Int. Cl.
*H04N 5/781* (2006.01)

(52) U.S. Cl. ..................... 386/125; 386/68; 386/46; 386/113; 386/91; 386/120

(58) Field of Classification Search .............. 386/46, 386/125, 68, 120, 91, 113
See application file for complete search history.

(56) References Cited

U.S. PATENT DOCUMENTS

| 5,107,481 A * | 4/1992 | Miki et al. ............... 369/53.21 |
| 5,438,423 A * | 8/1995 | Lynch et al. ................. 386/109 |
| 5,701,383 A * | 12/1997 | Russo et al. .................. 386/46 |
| 6,259,441 B1 * | 7/2001 | Ahmad et al. ............... 715/720 |
| 2002/0041754 A1 * | 4/2002 | Kikuchi et al. ................ 386/46 |

FOREIGN PATENT DOCUMENTS

| EP | 0 789 488 A2 | 8/1997 |
| JP | 10-56620 | 2/1998 |
| JP | 10-200919 A | 7/1998 |
| JP | 11-126206 A | 5/1999 |
| JP | 2000-149495 A | 5/2000 |
| JP | 2000-261750 A | 9/2000 |
| WO | WO 99/33265 | 7/1999 |

OTHER PUBLICATIONS

Japanese Office Action, dated Jul. 27, 2004 for Patent Application No. 2000-365928.
Japanese Office Action dated Mar. 22, 2005 for Appln. No. 2000-365928.
US 5,825,354, 10/1998, Ahmad et al. (withdrawn)

\* cited by examiner

*Primary Examiner*—Thai Q. Tran
*Assistant Examiner*—Helen Shibru
(74) *Attorney, Agent, or Firm*—Pillsbury Winthrop Shaw Pittman, LLP

(57) ABSTRACT

There is disclosed a method in which a recording section configured to record an external input signal, and a display signal output section configured to output a display signal based on at least one of the external input signal and a reproduction signal from the recording section are used. Here, when the display signal output section outputs the external input signal as the display signal, and a predetermined temporary interruption state is set at this time, the external input signal is recorded in the recording section.

6 Claims, 10 Drawing Sheets

PIP of on-air screen

Display of time difference between on-air and TS

DIGITAL RECORDING/REPRODUCING APPARATUS WITH BUILT-IN STORAGE MEDIUM

CROSS-REFERENCE TO RELATED APPLICATIONS

This application is based upon and claims the benefit of priority from the prior Japanese Patent Application No. 2000-365928, filed Nov. 30, 2000, the entire contents of which are incorporated herein by reference.

BACKGROUND OF THE INVENTION

1. Field of the Invention

The present invention relates to a recording/reproducing apparatus with a built-in storage medium, which is effectively applied to apparatuses with built-in hard disks or large-capacity semiconductor memories capable of recording/reproducing information.

Moreover, the present invention relates to a recording/reproducing apparatus which is effectively applied to apparatuses capable of simultaneously operating mediums such as hard disks and digital versatile disks (DVDs).

Particularly in the present invention, when a temporary interruption operation input is supplied during on-air display, an on-air signal is automatically continued to be stored in a built-in storage medium. When a temporary interruption operation is canceled, information from a time of interruption can be displayed for a user.

2. Description of the Related Art

In recent years, in image compression techniques, at present, a DVD standard has been proposed in which an internationally standardized moving image coding expert group (MPEG2) system is used, and further, an AC3 audio compression system is employed.

In accordance with an MPEG2 system layer, this standard supports the MPEG2 system in a dynamic image compression system, and supports the AC3 audio compression system and MPEG audio compression system in a sound compression system. Furthermore, sub picture data constituted by compressing a run length of bit map data can be treated as subtitles of movies, karaoke, and the like. Additionally, in this standard, regarding the playback apparatus, control data (navigation pack) for special playback such as fast-forwarding and reversing is additionally constituted. Moreover, in the standard, standards ISO9660 and micro UDF are supported, so that disk data can be read by a computer.

Furthermore, as the standard of media, subsequent to the standard of DVD-ROM as media of DVD-video, the DVD-RAM standard (4.7 GB) has also been completed, and DVD-RAM drives are becoming popular computer peripherals.

Additionally, at present, a DVD video standard which utilizes DVD-RAM and realizes a system capable of recording/reproducing information in real time, that is, a real time recording (RTR)-DVD standard is being completed, and a verification operation is also scheduled to end in the near future. The standard is developed based on the DVD video standard now on the market. Furthermore, a file system corresponding to the RTR-DVD is also standardized.

On the other hand, a system is also considered in which a hard disk drive (HDD) built into the recording/reproducing apparatus is utilized to record/reproduce a broadcast signal. In the hard disk drive, data of 20 G to 100 Gbytes or more can be recorded.

As described above, with the progress of image compression techniques, a recording/reproducing apparatus has been developed in which an information storage medium (DVD, hard disk, semiconductor memory) can effectively be utilized for recording a broadcast signal, and the like in real time.

(1) Here, the following operation modes of the apparatus are considered.

(1a) The broadcast signal (or a reproduction signal from another medium) is inputted into the recording/reproducing apparatus, and a display signal for a monitor is derived from the recording/reproducing apparatus. Additionally, the recording/reproducing apparatus records the broadcast signal (or the reproduction signal from another medium) into a built-in storage medium in response to an operation input.

(1b) The broadcast signal (or the reproduction signal from another medium) is inputted into the recording/reproducing apparatus, and the display signal for the monitor is derived from the recording/reproducing apparatus. In this case, the broadcast signal (or the reproduction signal from another medium) is not recorded into the built-in storage medium. This situation occurs when the signal is a copy prohibition signal.

(2) However, there is a problem in the operation mode described above in (1b), for example, when a user views a drama. For example, when there are interruptions such as a phone call, temporary visitor, and toilet time, the user has to temporarily leave a seat in front of a display. In this case, the user misses the drama for a certain time. Particularly, with the interruptions during display of the broadcast signal (on-air display), when the user returns to the seat, the drama has proceeded, and the user cannot understand a middle part of the drama in some cases. Particularly, when there are interruptions midway in important scenes of programs such as a detective drama, a live baseball game and the like, the user is dissatisfied. Moreover, with a pay program, the user, having missed the program for a certain time, is particularly dissatisfied.

BRIEF SUMMARY OF THE INVENTION

According to an aspect of the present invention, there is provided an apparatus in which a recording section configured to record an external input signal and a display signal output section configured to output a display signal based on at least one of the external input signal and a reproduction signal from the recording section are used. Here, when the display signal output section outputs the external input signal as the display signal, and when a predetermined temporary interruption state is set, the external input signal is recorded in the recording section.

According to another aspect of the present invention, for example, when a user temporarily leaves a seat before a monitor and again returns to the seat in a temporary interruption mode, the user cancels the interruption mode and reproduces the recorded signal stored in the storage medium, and can thereby continuously view a drama or the like.

DETAILED DESCRIPTION OF THE INVENTION

An embodiment of the present invention will be described hereinafter with reference to the drawings.

Figure 1:
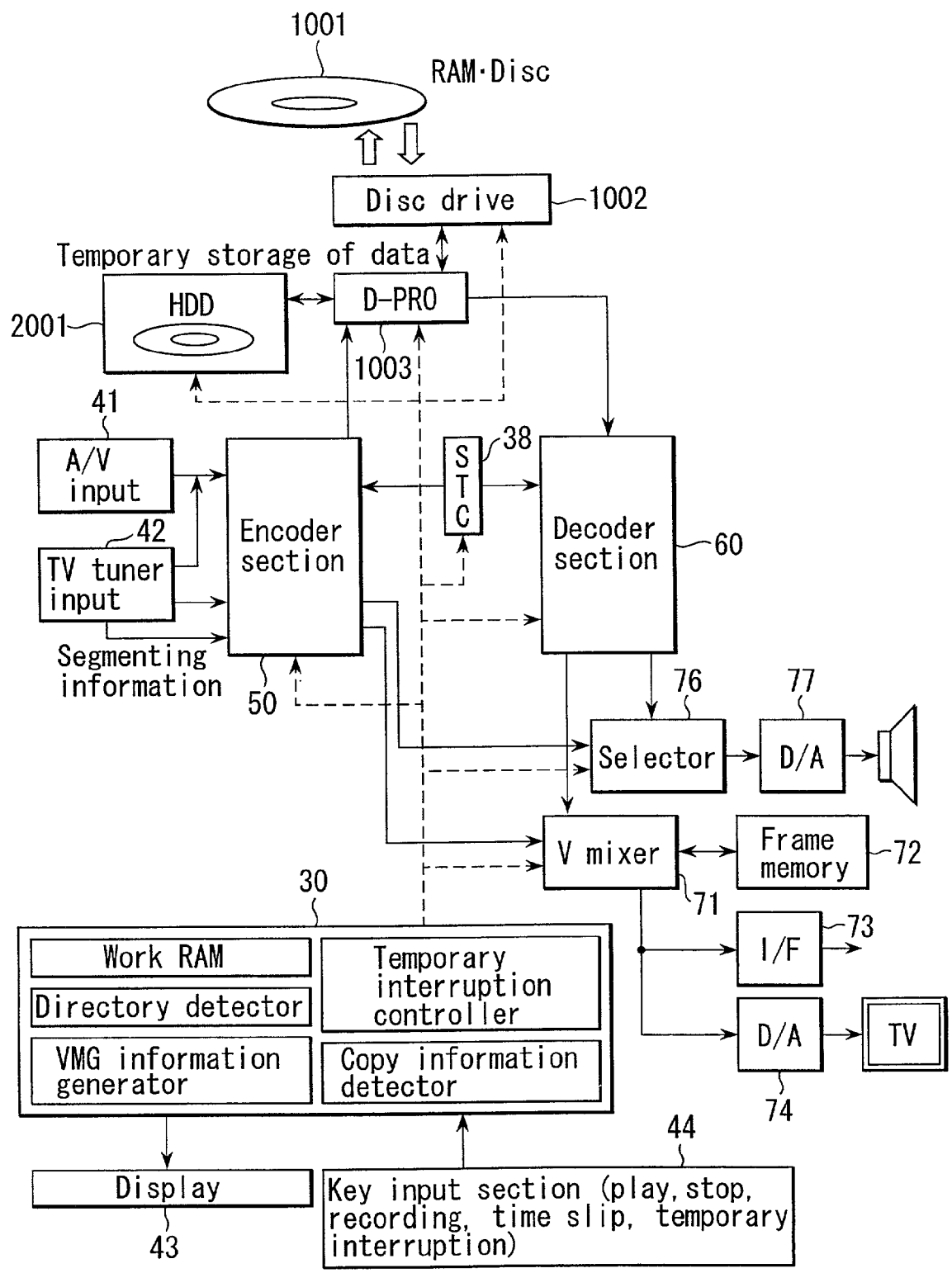
FIG. 1 is a diagram showing a whole constitution of a recording/reproducing apparatus according to an embodiment of the present invention.

FIG. 1 is a diagram showing one embodiment of a recording/reproducing apparatus to which the present invention is applied. In the embodiment, the recording/reproducing apparatus capable of handling both a DVD-RAM and a hard disk as recording mediums will be described, but the present invention can also be applied to an apparatus which handles only one of these mediums. Moreover, the hard disk or the DVD-RAM may be replaced by a storage medium such as a semiconductor memory.

Respective blocks of FIG. 1 are roughly divided into those of a recording section, shown on the left side, and those of a reproducing section, on the right side.

The recording/reproducing apparatus includes a hard disk drive 2001; a disc drive 1002 for rotating/driving an optical disc 1001 as an information storage medium which can construct a video file, and reading/writing information; and a data processor 1003 which can supply recording data to the hard disk drive 2001 and disc drive 1002 and which receives a reproduced signal. The data processor 1003 handles a recording or reproducing unit of data, and includes a buffer circuit, modulation/demodulation circuit, error correcting section, and the like.

Moreover, the recording/reproducing apparatus includes an encoder section 50 constituting a recording side, a decoder section 60 constituting a reproducing side, and a microcomputer block 30 for controlling an operation of an apparatus main body as main constituting elements.

The encoder section 50 includes video and audio analog/digital converters for digitizing an inputted analog video signal and inputted analog audio signal, a video encoder, and an audio encoder. The section further includes a sub picture encoder, a formatter for forming an output of each encoder into a predetermined DVD-RAM format, and a buffer memory. To the encoder section 50, an external analog video signal+external analog audio signal from an AV input section 41, or an analog video signal+analog audio signal from a television (TV) tuner 42 are inputted.

Additionally, when a digital video signal and digital audio signal are directly inputted to the encoder section 50, the digital video signal and digital audio signal are directly supplied to the formatter. Moreover, the respective video and audio signals can be supplied to a video mixing section and audio selector described later.

In the formatter, the digital video signal is converted to a digital signal which is compressed at a variable bit rate based on an MPEG2 or MPEG1 standard. The digital audio signal is converted to a digital signal which is compressed at a fixed bit rate based on an MPEG or AC-3 standard, or a digital signal of a linear PCM.

When sub picture information is inputted via the AV input section 41 (e.g., a signal from a DVD video player with an independent output terminal of a sub picture signal), or when a DVD video signal having such data constitution is broadcast, and received by the TV tuner 42, the sub picture signal (sub picture pack) in the DVD video signal is encoded by the sub picture encoder. Here, the sub picture signal is arranged in a predetermined signal mode, and converted into a predetermined format.

Here, in the present apparatus, information encoded by the encoder section 50 (video, audio, and sub picture data) and prepared management information can be supplied to the hard disk drive 2001 via the data processor 1003, and recorded on a hard disk. Moreover, the information recorded in the hard disk can be recorded on the optical disc 1001 via the data processor 1003 and disc drive 1002. In this case, the information recorded on the hard disk has the same data format as that of the optical disc 1001. Furthermore, the information encoded by the encoder section 50 and the prepared management information can also be recorded on the optical disc 1001 via the data processor 1003 and disc drive 1002. Additionally, a file or a video object recorded on the optical disc 1001 and hard disk can also be deleted.

Additionally, when the information recorded on the hard disk of the hard disk drive 2001 has a data format different from that of the optical disc 1001, the information read from the hard disk is encoded by the encoder section 50. Moreover, the encoded information can be recorded on the optical disc 1001. Furthermore, the disc drive 1002 has a rotation control system, laser driving system, optical system, and the like with respect to the optical disc 1001.

The microcomputer block 30 includes a microprocessing unit (MPU), or a central processing unit (CPU), and a ROM in which a control program, and the like are written, and a RAM which provides a work area necessary for executing the program.

The MPU of the microcomputer block 30 follows the control program stored in the ROM and uses the RAM as the work area to execute detection of a defective place, detection of an unrecorded area, setting of a video recorded information recording position, UDF recording, setting of an AV address, and the like.

Moreover, the microcomputer block 30 has an information processing section necessary for controlling the whole system, and includes a copy information detector, directory detector, VMG information generator, and temporary interruption controller.

For an execution result of the MPU, a content to be notified to a user is displayed in a display 43 of the DVD video recorder, or on-screen displayed (OSD) in a monitor display. Moreover, the microcomputer block 30 is connected to a key input section 44 for supplying an operation signal to operate the apparatus.

Additionally, timings of the microcomputer block 30 for controlling the disc drive 1002, data processor 1003, encoder section 50 and/or decoder section 60, and the like can be determined based on time data from an STC 38. A recording or reproducing operation is usually executed in synchronization with a time clock from the STC 38, but other processings may be executed at a timing independent of the STC 38.

The decoder section 60 comprises: a separator for separating and extracting each pack from a signal of a DVD format having the pack structure; a memory for use in separating the pack or executing other signal processing; a V decoder for decoding main picture data (content of the video pack) separated by the separator; an SP decoder for decoding sub picture data (content of the sub picture pack) separated by the separator; and an A decoder for decoding audio data (content of the audio pack) separated by the separator; and a video processor for appropriately combining the decoded main picture data with the decoded sub picture data, and superposing and outputting sub pictures such as menu, highlight button, and subtitle on a main picture.

An output video signal of the decoder section 60 is inputted to a video mixer 71. In the video mixer 71, text data is synthesized or mixed with the inputted signal. Moreover, the video mixer 71 is also connected to a line for directly extracting the signal from the TV tuner 41 or the A/V input section 42. The video mixer 71 is connected to a frame memory 72 for use as a buffer. When the video mixer 71 emits a digital output, the output is transmitted to the outside via an interface (I/F) 73. An analog output of the mixer is outputted to the outside via a digital/analog converter 74.

An output audio signal of the decoder section 60 is transmitted to a digital/analog converter 77 via a selector 76, converted to an analog signal, and outputted to the outside. The selector 76 can also select the signal transmitted through the encoder section 50, when the digital signal from the TV tuner 41 or the A/V input section 42 is directly monitored in response to a select signal from the microcomputer block 30.

Furthermore, during recording, the formatter 56 prepares each segmenting information, and periodically sends the information to the microcomputer block 30 (information of a time for GOP top interruption). Examples of the segmenting information include the number of packs of VOBU, end address of I picture from the top of VOBU, reproducing time of VOBU, and the like.

Additionally, the information from the aspect information detector 43 is sent to the MPU at the start of recording, and the MPU prepares VOB stream information (STI). Here, for the STI, resolution data, aspect data, and the like are stored, and each decoder performs initial setting based on the information during reproducing.

Moreover, for the video file, one file is stored in one disc in a video reproducing DVD.

Here, in a real time video recording/reproducing machine using DVD, it should be noted that a contiguous sector is necessary at minimum for accessing the data in order to reproduce the data without being interrupted during accessing (seeking). This unit is called a contiguous data area (CDA). That is, this data size is predetermined in order to realize a seamless reproducing.

The CDA preferably has an error correction code (ECC) block unit. Therefore, a CDA size is a multiple of 16 sectors, and the data is recorded by the CDA unit in the file system.

Here, a relation between management information of the real-time DVD and the video object as a content will briefly be described.

Figure 2:
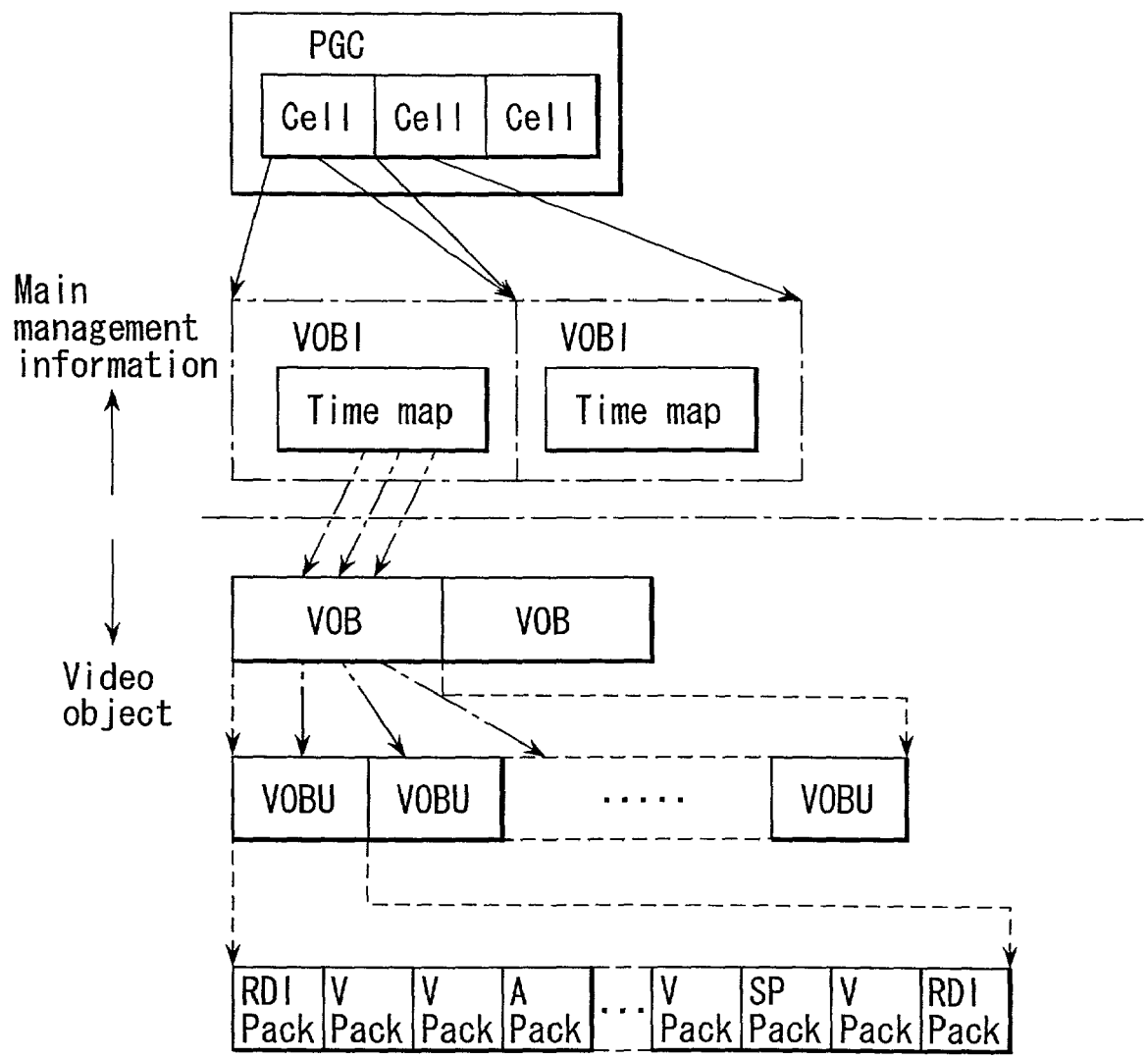
FIG. 2 is a data structure explanatory view showing a relation between management information and a video object in a DVD-RAM.

The video object (VOB) will first be described with reference to FIG. 2. The VOB is referred to as a VR_MOVIE.VRO file in a directory. A video file has a hierarchical structure, one file is constituted of a plurality of video objects (VOB), one VOB is constituted of a plurality of video object units (VOBU), and one VOBU is constituted of a plurality of packs. Examples of the plurality of packs include RDI packs, V packs, and A packs.

The RDI pack is a real-time data information pack (RDI_PCK). This pack includes information indicating a start time for reproducing a first field of the VOBU to which the pack belongs, information indicating a recording time of the VOBU, manufacturer information (MNFI), and the like. The pack also includes display control information (DCI) and copy control information (CCI). The display control information includes aspect ratio information, subtitle mode information, and film camera mode information.

The V pack is constituted by compressing video data by an MPEG2 system, and is constituted of a pack header, packet header, and video data section. The A pack is constituted by processing audio data by a linear PCM or MPEG, or AC3 system, and is constituted of the pack header, packet header, and audio data section.

The management information is referred to as a video manager (VMG), and a program chain (PGC) for managing a data reproducing order is defined in the manager. A cell (Cell) is defined in the program chain (PGC), and video object information (VOBI) as an object to be reproduced is defined in the cell (Cell). A portion on which concrete information of the PGC is recorded is a program chain information (PGCI) portion. The PGCI has two types: one is an original PGCI (ORG_PGCI); and the other is a user defined PGCI table (UD_PGCIT).

A time map (TMAP) is described in the VOBI, and the TMAP can designate the VOBU constituting the corresponding VOB. A link to the VOBI from the cell is defined by a logic address. Moreover, a link to the VOB and VOBI from the TMAP information is defined based on a stream number of the VOB, the number of VOBUs in the VOB, entry numbers for the respective VOBUs, and logic address to each target VOBU.

Figure 3:
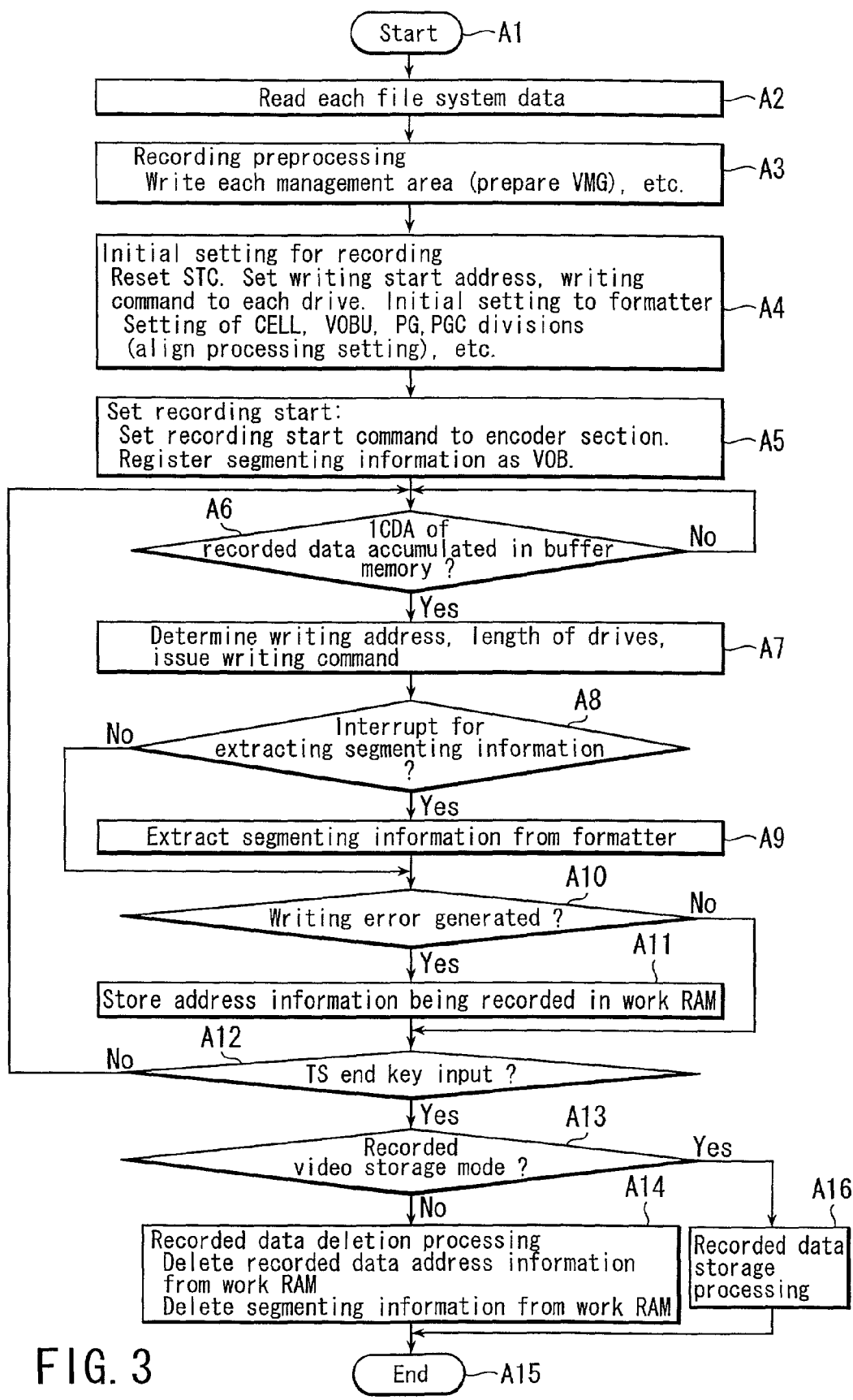
FIG. 3 is a flowchart showing a time slip (TS) recording operation of the apparatus according to the embodiment of the present invention.

FIG. 3 is a flowchart of an operation of a time slip recording function (recording function capable of recording an image on the hard disk, pursuing a recorded position, and reproducing the image).

It is now assumed that the time slip recording function is set. Then, data of each file system is read from a directory file of the hard disk based on control of the microcomputer block 30. That is, the management information (referred to as the video manager (VMG)) is read, and stored in the work RAM. When there is no VMG, a new VMG is prepared.

This processing corresponds to steps A1, A2, A3 performed mainly by the microcomputer block 30. Next, a recording initial setting is performed with respect to the encoder section 50. That is, the microcomputer block 30 checks a state in which recording is possible, and then performs recording initial setting. That is, the block resets the STC 38, sets a writing start address to each drive, sets a writing command, initially sets the formatter, and sets an align processing in which divisions of the VOB, VOBU in the VOB, program (PG), program chain (PGC) as the management information, cell, and the like are prepared/set (step A4). When the divisions are prepared/set, a register for storing link information of each management information and video object is set.

That is, at the start of recording, a recording start command is set to the encoder section 50, and the segmenting information in the formatter 56 is registered as the VOB unit (step A5). Thereby, when the recording starts, the frame of the input video signal is compressed by a GOP unit, the GOP is packed, and the packs are collected into a VOBU unit in the encoder section 50. Furthermore, the RDI pack (including navigation data) is disposed as the top pack of the VOBU. In this case, the audio pack, sub picture pack, and the like are also collected.

One CDA of encoded data is accumulated (step A6), then a writing address to the hard disk, and writing length are set, and a writing command is issued to the drive, so that one CDA of data is recorded in a vacant area of the hard disk (or a DVD-RAM). Thereby, writing of one CDA of data is executed.

It is next judged whether the segmenting information is accumulated in the formatter 56 (step A8). When the segmenting information is accumulated, an interrupt processing for extracting the segmenting information is executed (step A9). The segmenting information is temporarily taken as the VOB management information into the work RAM.

It is next checked whether a writing error is generated (step A10). When the writing error is generated, address information being recorded is once stored in the work RAM, and another address is set. It is next judged whether there is a TS end key input for ending the time slip operation (step A12). When there is no TS end key input, the flow returns to the step A6. With the TS end key input, it is judged whether or not a recorded video storage mode is set (step A13). In the recorded video storage mode, a recorded data storage processing (step A16) is performed. When the recording/reproducing mode is not set, a processing for deleting the recorded data is performed (step A14). In this case, the recorded data address information and segmenting information temporarily stored in the work RAM are also deleted.

Figure 4:
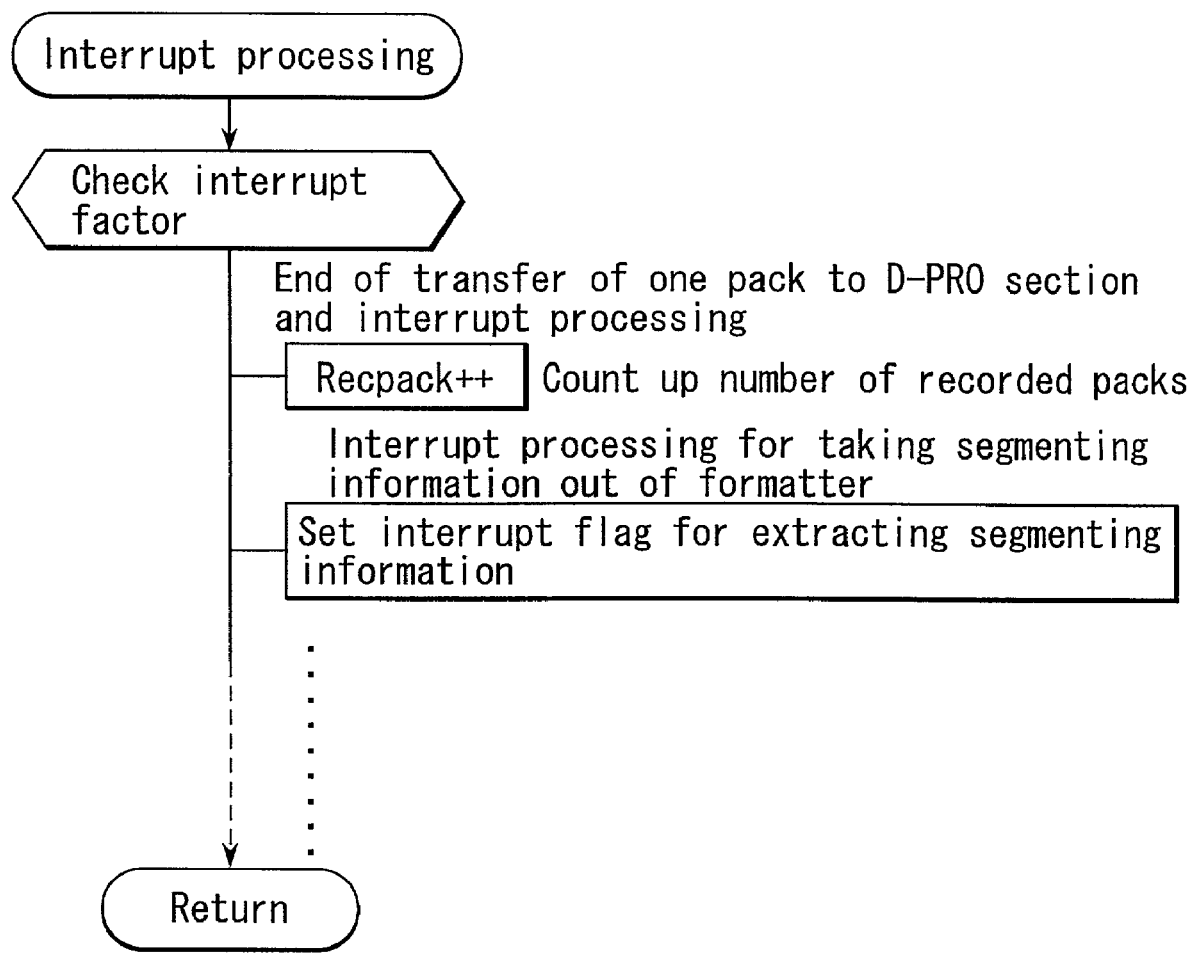
FIG. 4 is a flowchart showing an interrupt processing procedure as a part of the flowchart of FIG. 3.

A processing for an interrupt in the step A8 of FIG. 3 will briefly be described with reference to FIG. 4.

When interrupt information is detected, a factor for the interrupt is checked, the data for one pack is transferred to the data processor 1003, and the number of recorded packs starts to be counted up. Moreover, every time one piece of segmenting information is taken for the pack successively processed by the formatter in the encoder section 50, an interrupt flag is set. This processing is performed until the interrupt is canceled. When the interrupt is canceled, the flow goes through the steps A10, A11, A12. It is then judged from the number of recorded packs whether or not there is data for one CDA (step A6). Moreover, the interrupt flag is simultaneously deleted. Therefore, even when the interrupt processing is executed, the segmenting information for preparing the cell, VOBU, PG, PGC, and the like is not lost.

Figure 5:
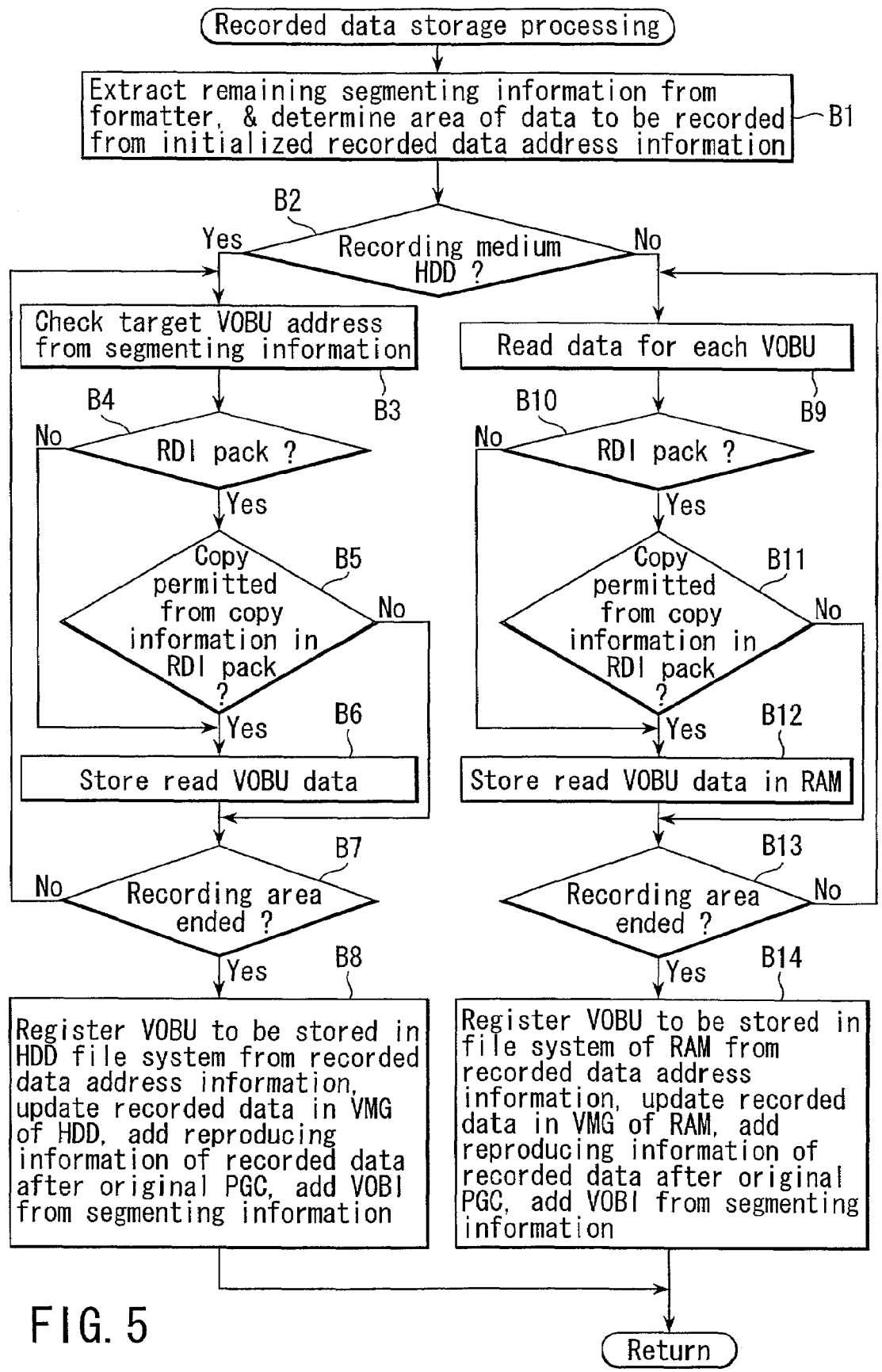
FIG. 5 is a flowchart showing a recorded data storage processing procedure as a part of the flowchart of FIG. 3.

FIG. 5 shows a content of the step A16 of FIG. 3 in detail.

A recorded data storage flow is indicated as a flow operated after the time slip end key is pressed. In the recorded data storage flow, the microcomputer block 30 takes the segmenting information from the formatter 56, and initializes the encoder section. Moreover, the area of the data to be stored (or transferred) is determined from the recorded data address information (step B1).

The area of the data to be stored (or transferred) is determined by the information selected by the user who views a reproducing screen as described later. Alternatively, the area may be determined by an automatic storing (or transferring) function for automatically storing (or transferring) all data subjected to time slip recording.

A processing method for the data to be stored (or transferred) differs with recording media such as the DVD-RAM, and hard disk. Therefore, it is judged whether the recording medium is designated as the DVD-RAM or the hard disk (step B2).

When the recording medium is designated as the hard disk, an address of VOBU as an object to be recorded (stored) is checked from the segmenting information (step B3). It is then checked whether there is an RDI pack (step B4). With presence of the RDI pack, information indicating whether the RDI pack can be copied is checked. It is therefore judged whether or not the pack can be copied (step B5). When there is no RDI pack, and copying is permitted, the VOBU data having the address read based on the address of the VOBU is stored (step B6).

Subsequently, it is checked whether the area of the data to be recorded (stored) ends (step B7). When the area of the data to be recorded (stored) does not end, the flow returns to the step B3 to check the address of the VOBU as the next object from the segmenting information. The steps B4 to B7 are repeatedly executed.

When the area of the data to be recorded (stored) ends, an operation of registering the VOBU to be stored in the file system as the management information in the hard disk by the recorded data address information is performed. That is, the management information of the image data of VMG of the hard disk is updated, so that the VOBU to be stored can be managed by the management information. Furthermore, image data reproducing information (cell, and the like) is further added after the original PCG. Additionally, the segmenting information is utilized to add video object information (VOBI) such as a search pointer.

Therefore, when the user designates the area of the data to be recorded (stored) from the video data recorded in the hard disk by the time slip in the recording mode, a storage object is determined, and real recording is performed.

In the aforementioned description, in order to store the recorded data, the management data for the recorded data is updated, prepared, and added, and a real recording state is obtained in which the recorded VOB data is stored as it is.

However, the invention is not limited to the aforementioned embodiment, and the following function may further be provided. That is, the area of the recorded data to be temporarily recorded on the hard disk (buffer area for time slip) is secured. Moreover, when the recorded data in the buffer area is to be stored as described above, an area for storing the image data is removed from the designation as the buffer area for time slip, and used as stored data. Furthermore, a supplementary buffer area is added to the decreased buffer area for time slip in order to compensate for the decrease.

Alternatively, the following system may be used.

That is, an area of the recorded data to be temporarily recorded on the hard disk (buffer area for time slip) is secured. Moreover, when the recorded image data is stored in the buffer area as described above, the image data to be stored may be copied in a position different from the buffer area for time slip. In this case, it is unnecessary to correct the buffer area for time slip.

Turning back to FIG. 5, the operation flow will be described.

When DVD is designated as the recording medium in the step B2, data for each VOBU is read (step B9), and presence/absence of RDI pack is checked (step B10). When the RDI pack exists, copy enable/disable information is checked (step B11).

When the copy enable/disable information of the RDI pack indicates permission for copying, the VOBU is stored in the DVD-RAM (step B12). It is judged with respect to the recorded data of the hard disk whether or not the area of the data to be recorded (transferred) is ended (step B13). When the area is ended, the flow advances to step B14. In the step B14, the management information of the VOBU to be stored is registered in the file system of the DVD-RAM based on the recorded data address information. That is, the management information of the image data in the video manager (VMG) of the DVD-RAM is updated. Furthermore, the image data reproducing information (cell, and the like) is added after the original PCG. Additionally, the segmenting information is utilized to add the video object information (VOBI) such as the search pointer.

Additionally, in the processing of FIG. 5, the recording area extends to a terminal end of the VOBU designated by recording end information from the top of the VOBU designated by recording start information.

Figure 6:
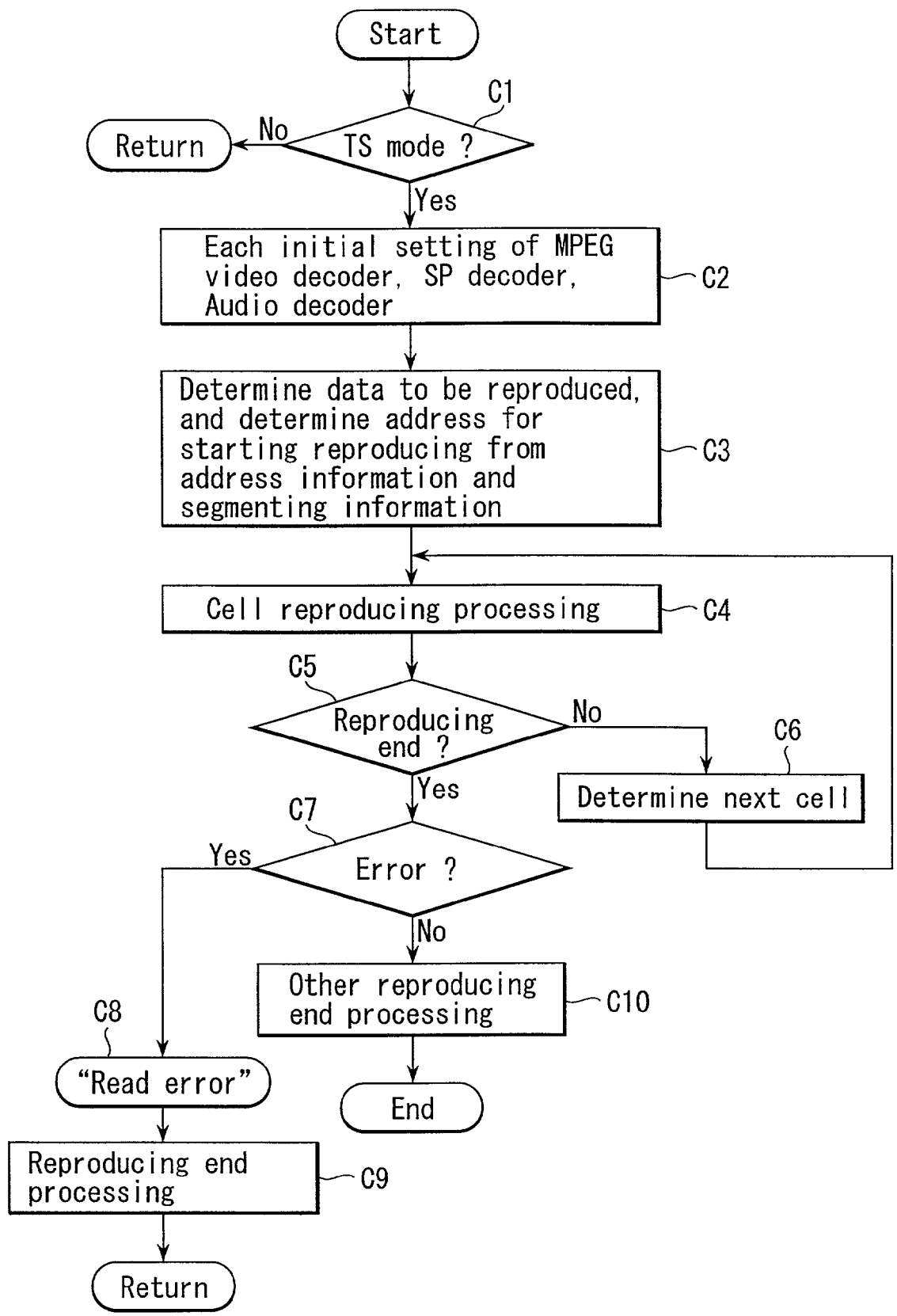
FIG. 6 is a flowchart showing an image reproducing operation procedure in a time slip mode.

FIG. 6 is a flowchart showing a reproducing operation to which the operation flow can be shifted, for example, by a monitor operation or reproducing operation performed during the time slip.

First, initial setting of the decoder section 60 is performed (steps C1, C2). Subsequently, data to be reproduced in the recorded data on a hard disk side is determined, and an address for starting reproducing is determined by the address information and segmenting information (step C3).

The flow next shifts to a cell reproducing processing (step C4), and reproducing is performed based on the time map. It is next checked whether or not the reproducing ends (step C5). When cell reproducing does not end, the next cell is determined (step C6), and the cell reproducing processing is continued. On the other hand, the cell reproducing ends, and it is then checked whether the reproducing is ended by an error (step C7). When the error is a read error (step C8), a reproducing end processing is performed (step C9) and the flow returns to start. When there is no error, the flow shifts to other processing during reproducing end (step C10), and ends.

Figure 7:
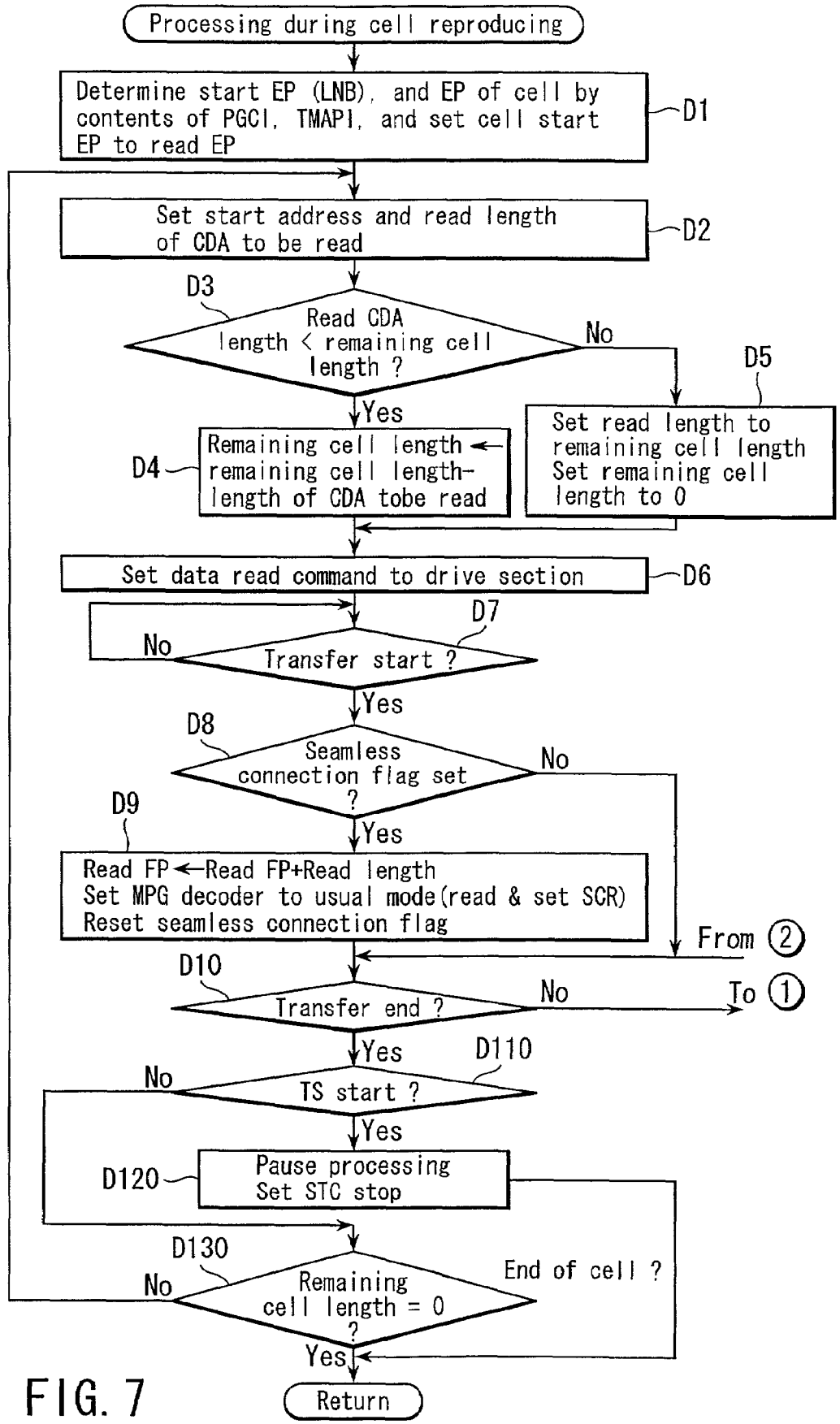
FIG. 7 is a flowchart showing a cell reproducing operation as a part of the flowchart of FIG. 6.
Figure 8:
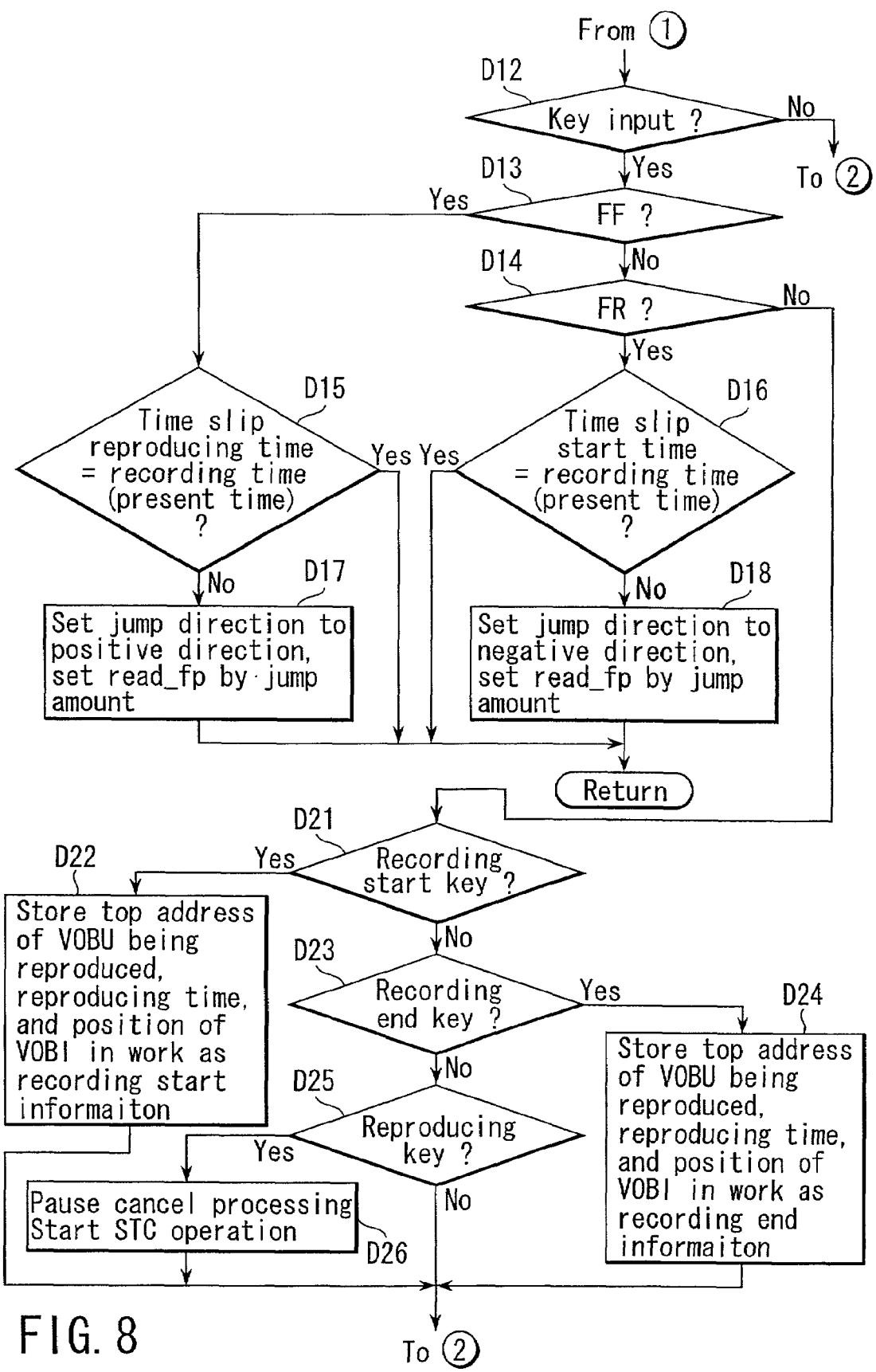
FIG. 8 is a flowchart continued from FIG. 7.

FIGS. 7 and 8 show the cell reproducing processing in the step C4 of FIG. 6 in detail.

A start entry point (EP(LBN)) and end entry point of the cell are determined (start EP, end EP) in accordance with contents of the program chain information (PGCI), video object information (VOBI), and time map information (TMAPI). The cell start entry point is set as a read entry point. A remaining cell length is obtained by subtracting a start address from an end address (step D1).

Moreover, the start address and reading length of the CDA to be read are set (step D2). It is next judged whether a length of the CDA to be read is smaller than a remaining cell length (step D3).

Subsequently, when the length is smaller, and the length of the CDA to be read is subtracted from the remaining cell length, the remaining cell length can be updated (step D4). Moreover, a reading command is set to the drive 35 based on the length of CDA to be read (step D6). When the length of the CDA to be read is larger than the remaining cell length in the step D4, the present reading length is set to the remaining cell length, and the updated remaining cell length is set to 0 (step D5).

When the reading command is set to the drive 35 (step D6), transfer is started (step D7). It is next judged whether or not a seamless connection flag is set (step D8). The seamless connection flag is included as seamless information (SMLI) in M_VOBU, and indicates whether or not the reproducing is to be performed in a seamless manner with respect to the previous VOB.

In a non-seamless state, it is judged whether or not the transfer ends (step D10). However, in the seamless state, the read length is added to the read entry point, and the next read entry point is determined (step D9).

At the end of the transfer, it is judged whether or not the time slip (TS) operation is to be performed (started). When the time slip function operates, it is necessary to perform the reproducing and also the recording function as shown in FIG. 2. The recording and reproducing are performed in a time division manner.

When the transfer ends (yes in step D10), and it is a time slip start, that is, the time slip function operates (yes in step D110), a pause processing (step D120) is performed. That is, a processing for freezing the display on the screen is performed. After the pause processing, the flow shifts to the step C5 of FIG. 6.

The operation of the time slip function in the operation flow means the following. That is, for example, when there are interruptions such as a phone call, temporary visitor, and toilet time, the user has to temporarily leave a seat in front of a display. In this case, the user misses the drama for a certain time. Particularly, with the interruptions during display of a broadcast signal (on-air display), when the user returns to the seat, the drama has proceeded, and the user cannot understand a middle part of the drama in some case. Particularly, when there are interruptions midway in important scenes of programs such as a detective drama, and a live baseball game, the user is dissatisfied. Therefore, it is necessary to compensate for information of a period in which a temporary interruption occurs, for example, during on-air display and the user leaves the seat before a monitor screen. For this, the time slip function is utilized, and the broadcast signal of the period in which the user leaves the seat is recorded on the hard disk. On the other hand, a pause state is set on the screen, and the user can view the screen of the interrupted period of the drama when next returning to the seat. After the pause processing, the flow shifts to the step C5 of FIG. 6.

Moreover, a time slip key is not operated in the step D110 (no in the step D110), and it is then judged whether the remaining cell length is 0 (no in step D130). When the remaining cell length is 0 (yes in step D130), the flow shifts to the step C5 of FIG. 6. When there is a remaining cell length (no in step D130), the flow returns to the step D2.

When the transfer does not end in the step D10 (no in the step D10), key input is judged (step D12). With the key input (yes in the step D12), it is judged whether there is a fast-forward command (step D13) or a reverse command (step D14).

With the fast-forward command (yes in the step D13), the time slip and monitor are being performed. Therefore, it is judged whether the reproducing time (time slip reproducing position) is the same as a recording time (present recording position) (step D15). Alternatively, it is judged whether there is a certain degree of or more difference ibetween the reproducing time and the recording timeî (step D15). When a condition for the fast-forward is obtained as a result of judgment (no in step D15), a jump direction is set to a positive direction, a reading position (reading file entry point; read_fp) is set in accordance with a jump amount (step D17), and the reproducing processing is performed by jumping to the reading position.

Moreover, with the reverse command (no in the step D13; yes in the step D14), it is judged whether a time slip start time (time slip recording start position) is the same as the recording time (present recording position) (step D16). When a condition for the reverse is obtained as the result of judgment (no in step D16), the jump direction is set to a negative direction, the reading position (reading file entry point; read_fp) is set in accordance with the jump amount (step D18), and the reproducing processing is performed by jumping to the reading position.

This reading file entry point is determined based on the jump amount and time map information TMAPI. That is, even with a large jump amount, when desired time information described in time map information is insufficient, the jump amount is automatically limited in order to avoid an inadvertently excess jump.

Additionally, the iread_fpî can be determined by the time map information TMAPI in consideration of the jump amount.

The fast-forward or reverse operation in the reproducing (monitor mode) during the time slip (TS) has been described above, and the recording operation is performed as follows.

As shown in FIG. 8, a recording start key is operated (step D21), a top address of the VOBU being reproduced, reproducing time, and position of the VOBI in a work are stored as recording (storage) start information (step D22), and the flow shifts to the step D10. Moreover, a recording end key is operated (step D23), the top address of the VOBU being reproduced, reproducing time, and position of VOBI in the work are stored as recording (storage) end information (step D24), and the flow shifts to the step D10.

Furthermore, the reproducing key is operated (step D25), and this means that the user returns. Then, a pause operation is canceled (step D26), time-slip reproducing is started, and the flow shifts to the step D10.

Figure 9:
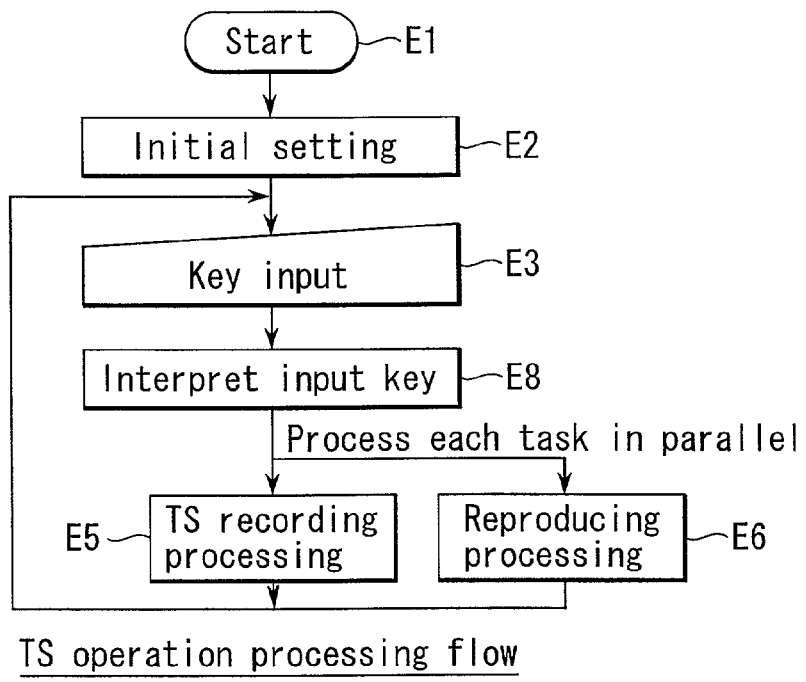
FIG. 9 is a flowchart schematically showing a whole operation of the apparatus according to the embodiment of the present invention.

FIG. 9 shows a basic operation processing flow of the present apparatus.

The apparatus is started, the encoder and decoder sections are initialized, and a command input from an operation key is waited for (steps E1, E2). When there is a key input, a content of the command of the key input is interpreted (steps E3, E4), and the flow shifts to a time slip recording processing (step E5) and/or a reproducing processing (step E6). Subsequently, the recording processing and reproducing processing are performed in a time sharing manner for each disk, and the processing is performed in parallel. The reproducing processing includes a reproducing processing in a time slip mode and a usual reproducing processing.

Figure 10A:
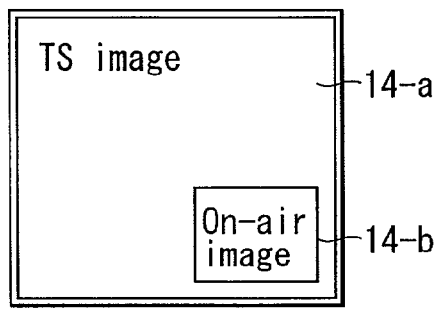
FIGS. 10A-10C are explanatory views each showing a display example of a display signal outputted from the apparatus according to the embodiment of the present invention.

These reproducing processing contents are selected and determined in accordance with a key operation state. When the reproducing operation of the monitor mode is performed in the time slip mode, a time-slipped recorded image is reproduced. Moreover, in this case, when a sub screen display and on-air display key is selected, a screen is obtained as shown in FIG. 10A. FIG. 10A shows a situation in which a time slip image 14-*a* and on-air image 14-*b* are displayed on a monitor screen.

Figure 10B:
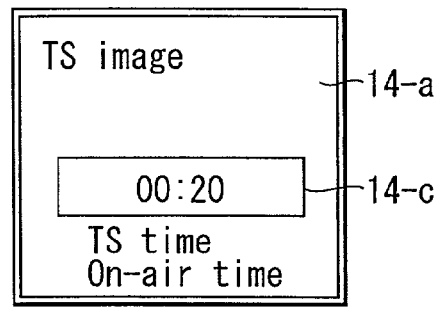
Figure 10C:
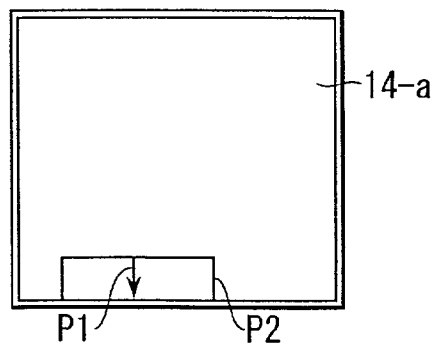

Furthermore, when the reproducing operation is performed in the time slip mode, the time-slipped recorded image is reproduced. Subsequently, when an operation input of time difference display is performed, a time difference 14-*c* between an on-air time (present time) and the time-slipped image is displayed. For example, the difference is numerically displayed as 20 minutes as shown in FIG. 10B. Alternatively, as shown in FIG. 10C, the time difference between an image reproduced by the time slip and the on-air image may be displayed by a time bar BA. That is, a point P1 indicates an image point reproduced by the time slip, and a point P2 indicates an on-air image point.

Various display modes can be realized.

In this case, when the fast-forward or fast-reverse operation is performed, the point P1 can be moved to an arbitrary position on the time bar BA.

In the embodiment of the present invention, as described above, there is provided a first recording/reproducing medium (hard disk) for the time slip. Moreover, a removable second recording/reproducing medium (recordable DVD-R, recordable/reproducible DVD-RAM or DVD-RW, and the like) can be controlled.

As described above, according to one embodiment of the present invention, there is provided an apparatus comprising: a storage medium (2001) built into the apparatus; encoding means (50) for storing a recording signal obtained by converting an external input signal to a recording format in the storage medium; and decoding means (60) for supplying a decoded signal obtained by decoding the recording signal stored in the storage medium to display signal output means. Moreover, there is provided display signal output means (71) for processing at least the external input signal or the decoded signal and outputting a display signal. Here, there is provided control means (30) for responding to a temporary interruption setting signal, controlling the encoding means to store the recording signal in the storage medium, and controlling the display signal output means to output a pause signal, when the display signal output means processes the external input signal and outputs the on-air display signal.

Here, when a temporary interruption cancel signal for canceling the temporary interruption setting signal is inputted, the operation restarts from a screen next to a screen of a pause time in the time slip mode, and video information recorded on the hard disk is reproduced. Therefore, the user can view the rest of the program without any omissions, and this is particularly effective in a pay broadcast, and the like.

Figure 11:
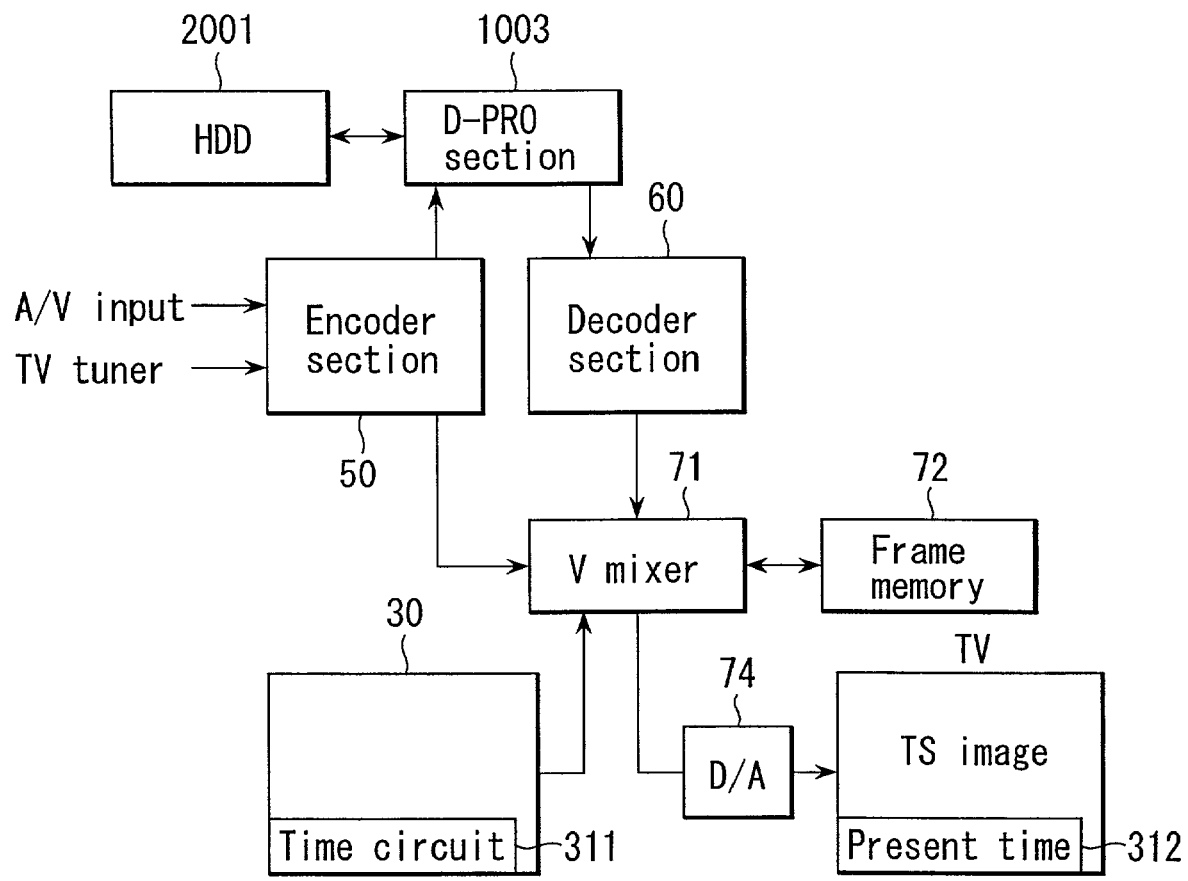
FIG. 11 is a constitution diagram showing another embodiment of the present invention.

FIG. 11 further shows another embodiment.

When the time slip operation is executed, time information multiplexed with an image displayed on the display screen differs from the present actual time information. Therefore, when the image is reproduced in the time slip mode in the apparatus, present time information of a time circuit 311 in the microcomputer block 30 is supplied to the video mixer 71, and may be displayed as time information 312 on the screen.

Furthermore, when a time image is multiplexed with the image reproduced in the time slip mode, the corresponding portion may be detected and deleted, and the image may be outputted. Additionally, with a time display button, the present time information of the time circuit 311 in the microcomputer block 30 may be supplied to the video mixer 71, and displayed as the time information 312 in the screen in the time slip reproducing mode.

According to an aspect of the present invention, the time slip function is effectively utilized. It has been described in the embodiment that with the temporary interruption setting, the time slip operation key is operated during the on-air display. However, this is not limited, and of course an operation key for temporary retreat (temporary interruption) may independently be disposed.

Furthermore, according to another aspect of the present invention, the fast-forward function can be operated. Thereby, it is also possible to fast-forward reproduce the recorded data in a temporarily interrupted period and catch up with a broadcast screen of the present time.

The apparatus which can handle two storage mediums, that is, the hard disk and DVD-RAM has been described above, but the present invention can also be applied even to an apparatus which handles either storage medium. Moreover, the operation of the time slip recording with respect to the hard disk has been described, but a semiconductor memory may be used instead of the hard disk.

As described above, according to the embodiment of the present invention, it is possible to compensate for the information of the period in which the temporary interruption occurs during the on-air display and the user leaves the seat before the monitor screen, and the user can view a continuous picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of controlling operation of a digital video recording/reproducing apparatus that includes a recording section configured to record an input signal, a reproducing section configured to reproduce the recorded input signal, a display signal output section configured to output a display signal corresponding to at least one of the input signal and the reproduced recorded input signal, and a control section configured to control the operation of the digital video recording/reproducing apparatus, wherein the input signal is configured to be recorded as a video object (VOB) in unit of a video object unit (VOBU) including a real-time data information pack (RDI pack) which is located at a leading portion of the video object unit (VOBU) and includes information indicating a start time of the video object unit (VOBU), said operation including a time slip mode that enables reproduction of the input signal being recorded or compensates for information for a period in which a temporary interruption occurs, said method comprising:
   commencing recording of the input signal using the video object unit (VOBU) including said real-time data information pack (RDI pack); and
   when a predetermined storage mode is set, commencing storage processing of data corresponding to the video object (VOB), said storage processing being performed using a given buffer area;
   when the predetermined storage mode is not set, commencing delete processing that removes the data in the buffer area; and
   when the time slip mode is entered and subsequent reproducing processing is performed, effecting a fast forward operation or a fast reverse operation in the reproducing processing of said video object (VOB).

2. A digital video recording/reproducing apparatus, comprising:
   a recording section configured to record an input signal, wherein the input signal is configured to be recorded as a video object (VOB) in unit of a video object unit (VOBU) including a real-time data information pack (RDI pack) which is located at a leading portion of the video object unit (VOBU) and includes information indicating a start time of the video object unit (VOBU);
   a reproducing section configured to reproduce the recorded input signal from the recording section;
   a display signal output section configured to output a display signal corresponding to at least one of the input signal and the reproduced recorded input signal, and
   a control section configured to control operation of the digital video recording/reproducing apparatus, wherein the control section includes:
      a first section configured to start recording of the input signal;
      a second section configured to start storage processing of data corresponding to the input signal, when a predetermined storage mode is set, the storage processing being performed using a designated buffer area;
      a third section configured to start delete processing of the data, when the predetermined storage mode is not set, the stored data in the buffer area being deleted by the delete processing, and
      a fourth section configured to enter a time slip mode that enables reproduction of the video object (VOB) corresponding to the input signal being recorded or compensates for information of a period in which a temporary interruption occurs, and to effect a fast forward operation or a fast reverse operation in reproducing processing of the reproducing section.

3. The apparatus of claim 2, wherein said display signal output section is configured to output the display signal corresponding to the external input signal and the reproduced recorded external input signal, to thereby display both images of the external input signal and the reproduced recorded external input signal on a same display screen.

4. The method of claim 1, wherein the display signal corresponds to the external input signal and the reproduced recorded external input signal, said method further comprising:
   displaying both images of the external input signal and the reproduced recorded external input signal on a same display screen.

5. A method of controlling operation of a digital video recording/reproducing apparatus which includes a recording section configured to record an input signal, a reproducing section configured to reproduce the recorded input signal, a display signal output section configured to output a display signal corresponding to at least one of the input signal and the reproduced recorded input signal, and a control section configured to control the operation of the digital video recording/reproducing apparatus, wherein the input signal is configured to be recorded as a video object (VOB) in unit of a video object unit (VOBU) including a real-time data information pack (RDI pack) which is located at a leading portion of the video object unit (VOBU) and includes information indicating a start time of the video object unit (VOBU) as well as information indicating a recording time of the video object unit (VOBU), said operation including a time slip mode enabling to reproduce the input signal being recorded or to compensate for information of a period in which a temporary interruption occurs, said method comprising:
   commencing recording of the input signal using the video object unit (VOBU) including said real-time data information pack (RDI pack),
   when a predetermined storage mode is set, commencing storage processing of data corresponding to the video object (VOB), said storage processing being performed using a given buffer area,
   when the predetermined storage mode is not set, commencing delete processing that removes the data in the buffer, and
   when the time slip mode is entered and subsequent reproducing processing is performed, effecting a Fast Forward operation or a Fast Reverse operation in the reproducing processing of said video object (VOB).

6. A digital video recording/reproducing apparatus comprising:
   a recording section configured to record an input signal, wherein the input signal is configured to be recorded as a video object (VOB) in unit of a video object unit (VOBU) including a real-time data information pack (RDI pack) which is located at a leading portion of the video object unit (VOBU) and includes information indicating a start time of the video object unit (VOBU) as well as information indicating a recording time of the video object unit (VOBU);

a reproducing section configured to reproduce the recorded input signal from the recording section, a display signal output section configured to output a display signal corresponding to at least one of the input signal and the reproduced recorded input signal, and a control section configured to control operation of the digital video recording/reproducing apparatus, wherein said control section include a first section configured to start recording of the input signal;

a second section configured to start storage processing of data corresponding to the input signal, when a predetermined storage mode is set, the storage processing being performed using a given buffer area;

a third section configured to start delete processing of the data, when the predetermined storage mode is not set, the stored data in the buffer area being deleted by the delete processing, and a fourth section configured to enter a time slip mode that enables reproduction of the video object (VOB) corresponding to the input signal being recorded or compensates for information of a period in which a temporary interruption occurs, and to effect a Fast Forward operation or a Fast Reverse operation in reproducing processing of the reproducing section.

\* \* \* \* \*